(12) United States Patent
Glotzl

(10) Patent No.: US 8,128,142 B2
(45) Date of Patent: Mar. 6, 2012

(54) CLAMP

(75) Inventor: Reiner Glotzl, Pentling (DE)

(73) Assignee: Krones AG, Neutraubling (DE)

( * ) Notice: Subject to any disclaimer, the term of this patent is extended or adjusted under 35 U.S.C. 154(b) by 364 days.

(21) Appl. No.: 12/499,579

(22) Filed: Jul. 8, 2009

(65) Prior Publication Data

US 2010/0007160 A1     Jan. 14, 2010

(30) Foreign Application Priority Data

Jul. 12, 2008    (DE) .......................... 10 2008 032 923

(51) Int. Cl.
     *B25J 15/02*        (2006.01)
(52) U.S. Cl. ..................... 294/116; 294/99.1; 198/803.9
(58) Field of Classification Search .................. 294/196, 294/203, 116, 99.1; 198/803.9
See application file for complete search history.

(56) References Cited

U.S. PATENT DOCUMENTS

| | | | | |
|---|---|---|---|---|
| 4,034,542 | A | * | 7/1977 | Loehr .............................. 56/333 |
| 5,102,287 | A | * | 4/1992 | Johnson et al. ............... 414/618 |
| 5,253,911 | A | * | 10/1993 | Egan et al. ..................... 294/116 |
| 5,893,700 | A | | 4/1999 | Kronseder |

FOREIGN PATENT DOCUMENTS

| | | |
|---|---|---|
| DE | 29915297 | 3/2000 |
| EP | 0795500 B1 | 9/1997 |
| EP | 1 277 693 B1 | 1/2003 |
| EP | 1 930 259 A1 | 6/2008 |
| WO | WO-2006102983 | 10/2006 |

* cited by examiner

*Primary Examiner* — Dean Kramer

(74) *Attorney, Agent, or Firm* — Marshall, Gerstein & Borun LLP

(57) ABSTRACT

A clamp for holding containers, having two rigid gripping arms that are pivotably supported about at least one axis in opposite direction and have clamp structures at one end, a force accumulator which is operative between the gripping arms, gripping-arm closing levers as extensions of the gripping arms towards the other axis side, a closing cam which is rotatable between the closing levers, with at least one closing lever being actuatable by the closing cam via an elastic deformation area, the deformation area is a section of an arm which acts on the closing cam and which is constructionally separated from the gripping arm and which is positively coupled with the gripping arm for joint pivotable movement, and a defined deformation space is provided at least in a substantially undeformed state of the section between a stop on the closing lever and the section.

13 Claims, 2 Drawing Sheets

US 8,128,142 B2

CLAMP

CROSS-REFERENCE TO RELATED APPLICATION

The present application claims the benefit of priority of German Patent Application No. 102008032923.1, filed Jul. 12, 2008. The entire text of the priority application is incorporated herein by reference in its entirety.

FIELD OF THE DISCLOSURE

The present disclosure relates to a clamp such as used for gripping and transporting containers in beverage bottling operations.

BACKGROUND

Such clamps are used in large numbers of pieces in container treating or transporting devices so as to temporarily grip and position containers, such as bottles, e.g. PET bottles. A firm seat of the container in the clamp is an important precondition for a smooth operation of the devices. Since the grip width of the containers can vary and since each container must be held independently of the existing grip width in an equally neatly centered way, clamps are used that are controlled between an opened insertion position and a closed gripping position, and in which elastic members are contained for compensating for such grip width variations.

WO 2006/102983 A refers to a clamp in which the closing levers formed in one piece with the gripping arms are directly acting on the closing cams. The elastic deformation areas are integrated into the closing levers, each time between the axis and the free end. The force accumulator consists of two mutually repelling permanent magnets at the axis side facing the gripping structures and acts on the gripping arms in the opening direction of the clamp. The closing cam has, for instance, an oval cross-section. In a rotary position of the closing cam the closing levers converge to a maximum degree under the action of the force accumulator whereas in another rotary position the gripping structures are moved towards each other and a container inserted between the gripping structures is retained. The rotary position of the closing cam defines the closing force acting on the container, in cooperation with the elasticity of the deformation area. The elasticity of the deformation area compensates for grip width variations. Since the deformation areas must absorb not only the loads needed for compensating for grip width variations, but must transmit all loads from the closing cam up to the gripping structures, fatigue breaks may occur. The reason is that excessive forces might act on the deformation area, e.g. when a container to be gripped is misaligned and/or eccentrically stuck due to outside influences, or if another obstacle blocks the closing movement of one or both gripping arms.

DE-299 15 297 U refers to a clamp in the case of which curved leaf springs are positioned in the closing levers of both gripping arms and abut on the closing cam. The leaf springs are seated with a play in the press direction of the closing cam in recesses of the closing lever, with a pressure spring being used behind each spring leaf. This spring assembly serves to compensate for grip width variations of the container. The structure is of a multipart type. Furthermore, a plurality of narrow and undercut cavities are present, so that it is difficult to clean the clamps. Since every spring assembly is subject not only to deformations for compensating for grip width variations, but must transmit all forces between the closing cam and the gripping arm, fatigue breaks may occur or, in cases of emergency, excessive forces may act on the spring assemblies until these get into abutment, with at least the pressure springs getting easily damaged in this process.

SUMMARY OF THE DISCLOSURE

It is the object of the present disclosure to indicate a clamp that, while being of a simple construction, and despite the possibility of compensating for grip width variations of the container, is functionally reliable.

Owing to the constructional separation between the arm and the gripping arm with its closing lever and thanks to the limited deformation space between the stop on the closing lever and the elastically deformable section, the section is only used for compensating for grip width variations while it is abutting in case of increased forces, and these increased forces are directly transmitted from the closing lever to the closing cam, or vice versa, without any further deformation. Hence, since the section is exempted from the transmission of excessive forces just by way of its elasticity, the average load on the section itself is reduced even in case of a long service life with many operating cycles, so that a fatigue break is almost exclusively ruled out, and the section does not suffer any damage caused by high forces arising in emergency or malfunction situations. This enhances the operational reliability of the clamp considerably. Furthermore, the constructional separation offers the advantage of an inexpensive manufacture and mounting of the clamp, and the clamp can be cleaned easily.

In an expedient embodiment, the arm is pivotably supported together with the gripping arm about the axis. In combination with the positive coupling, the joint pivotal support has the effect that the arm moves almost as one unit with the gripping arm, and it is only the section of the arm acting on the closing cam that is movable to a limited degree relative to the closing lever to compensate for the grip width variations of the container.

In a constructionally simple way the positive coupling comprises at least one abutment area arranged on the gripping arm and the closing lever, respectively, and/or on the arm. Preferably, one abutment area is provided at each axis side near the axis, in which abutment area the arm and the closing lever and the gripping arm, respectively, are adjacent and move within the extension area between the abutment areas jointly about the axis.

Expediently, the respective abutment area is block-shaped, so that at both sides of the block large cleaning openings are defined, in which the clamp can be cleaned easily. These cleaning openings can be formed without any constrictions and undercuts.

In a preferred embodiment the elastically deformable section extends between the abutment area arranged at the axis side facing the closing cam, and a free end of the arm. This gives the section a relatively great usable bending length, so that the resistance to deformation within the lift given by the deformation space remains relatively constant.

Expediently, a thickened support body, which rests on the closing cam, is provided at the free end of the arm so as to achieve a high resistance to wear at that place.

The stop on the closing lever of the gripping arm may be an elevated prolongation facing the closing cam, which in pivotal direction is aligned with the support body or a zone of the section near the support body. In this way, after overcoming the deformation space, the stop of the closing lever is brought into abutment directly on the support body or near the support body, so that a parasitic lever arm is no longer active, but even high forces are transmitted directly at that place from the stop to the closing cam, or vice versa, without deforming the section any further.

For the compensation of grip width variations it would be enough to assign an arm only to one gripping arm. However, in order to center the gripped container independently of grip width variations always at an exactly predetermined position, an arm with an elastically deformation section is expediently assigned to each gripping arm, i.e. the clamp is of a symmetrical construction.

In an expedient embodiment, the arm is a one-piece shaped part of plastics, and the gripping arm may be a one-piece shaped part of metal. In the case of the shaped part of plastics, the elasticity due to the material can be used for compensating for grip width variations, optionally backed by a corresponding configuration of the cross-section of the section.

In an expedient embodiment the arm between the abutment areas in which it is positively coupled with the closing lever is a bearing lug. Likewise, the gripping arm may also be provided with a bearing lug. A common bearing bushing is then inserted into both bearing lugs that have the same size and are coaxially positioned.

In an expedient embodiment that permits compact dimensions of the clamp, the bearing lug of the arm has a transverse slot, and the bearing lug of the gripping arm is positioned in the transverse slot.

The force accumulator, which is e.g. used for spreading the gripping structures apart, could be mounted on the gripping arms. In an expedient embodiment, however, the arm is extended beyond the bearing lug and a receiving means for the components or for one component of the force accumulator is provided on the extension. This receiving means is preferably a cup-shaped receiving means for a disc-shaped permanent magnet.

To transmit the opening force of the force accumulator directly into the gripping arms, the abutment area facing the gripping structure is positioned between the gripping arm and the receiving means of the arm in an expedient embodiment.

In an expedient embodiment, the section of the arm intended as the deformation area is configured as a bending rod which, which measured in pivotal direction about the axis, is provided with a thickness that is smaller than the thickness in the further extension of the arm.

BRIEF DESCRIPTION OF THE DRAWINGS

An embodiment of the subject matter of the disclosure shall now be explained with reference to the drawings, in which.

DETAILED DESCRIPTION OF THE PREFERRED EMBODIMENT

Figure 1:
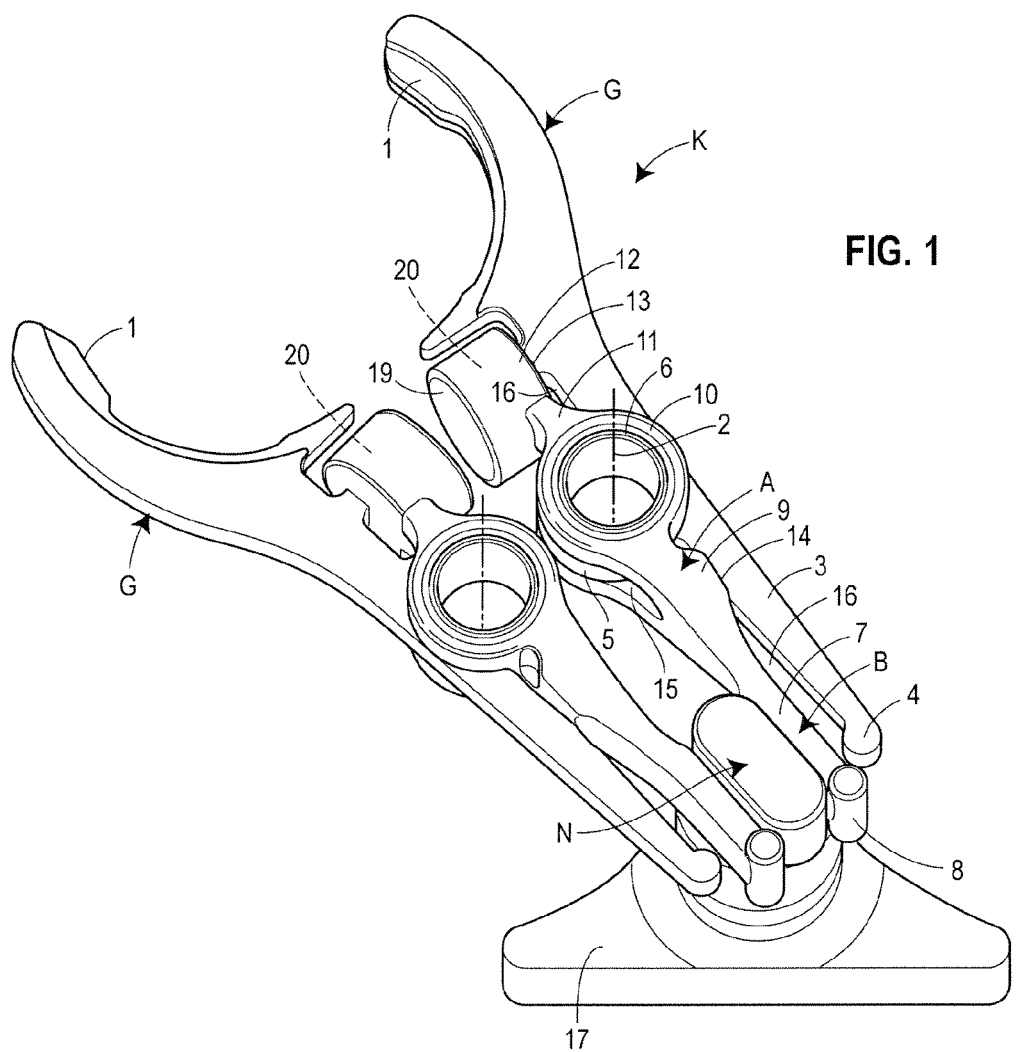
FIG. 1 is a perspective view of a clamp for holding containers, in an opened position.

A clamp K as shown in FIG. 1 for preferably temporarily retaining and positioning a container (not shown), for instance a PET bottle, is arranged in a container treating and transporting apparatus (not shown) on a carrier (not shown). The clamp K comprises two gripping arms G, which are for instance configured as shaped parts of metal and which in the illustrated embodiment are arranged to be pivotable in opposite direction about two separate axes 2. In an alternative (not shown), a joint axis 2 could also be used for the two gripping arms G. Each gripping arm is provided at one end with an inside gripping structure 1 for retaining the container and is extended beyond the axis 2 towards the other axis side with a closing lever 3, the free end of which carries a stop 4 spaced apart from a closing cam N. In the extension of the gripping arm G a bearing lug 5 is formed having a bushing 6 seated therein that pivotably supports the gripping arm G about axis 2.

Furthermore, at least one gripping arm G of the clamp K, preferably each gripping arm G, has assigned thereto on the inside an arm A configured as a shaped part of plastics, which as an elastic deformation area B includes a section 7 configured in the form of a bending rod. At the free end of the section 7, a support body 8, which rests on the closing cam N, is provided, e.g. a pin-like thickening positioned in parallel with the lateral surfaces of the closing cam N. Section 7 is followed towards axis 2 by a broadened section 9 of the arm A, which section 9 includes a bearing lug 10 that is also pivotably supported about axis 2 by means of the bushing 6. Beyond the bearing lug 10, the arm A has an extension 11 with a receiving means 12 that is closed by a lid 19 and includes a force accumulator 20, e.g. a permanent magnet, which cooperates in a repelling manner with a permanent magnet contained in the other arm A in the receiving means 12 thereof.

In the opened position of the clamp K, which is shown in FIG. 1, the sections 7 which possibly rest on the closing cam N (or on stops e.g. of the carrier, which are not shown) are biased under the opening force of the force accumulator 20. A predetermined deformation space is provided between the support bodies 8 and the stops 4.

The arm A which is constructionally separated from the gripping arm G and pivotably supported, per se with a movement of its own, is positively coupled to the gripping arm G and the closing lever 3, respectively, so that said two components jointly move about the axis 2. In the illustrated embodiment abutment areas 13, 14 are each provided near the bearing lugs 5, 10 at both axis sides. The abutment area 13 expediently directly engages the receiving means 12 so as to transmit the force action of the force accumulator 20 at said place directly into the gripping arm G. The arm A is higher in the direction of axis 2 than the gripping arm G. The bearing lug 10 of the arm A has a transverse slot 15 in which the smaller bearing lug 5 of the gripping arm G is inserted. The bushing 6 extends from the upper side of the bearing lug 10 up to the bottom side thereof.

The abutment areas 13, 14 are expediently formed by block-shaped structures that are arranged on the gripping arm G and the closing lever 3, respectively, and/or on the arm A, and are defined at both sides by generously dimensioned cleaning openings 16.

The closing cam N is connected to a control linkage 17 that is actuated by a mechanism (not shown) in such fashion that the closing cam N is rotated out of the illustrated position in the one and/or other rotary direction. In this process, the closing cam N acts on each support body 8, whereby each arm A is pivoted about axis 2. Thanks to the positive coupling in the abutment areas 13, 14 the gripping arm G is co-rotated in synchronism, so that in the end the container introduced between the gripping structures 1 is gripped and retained. When the closing cam N is rotated further in the gripped condition of the container, the section 7 gets elastically deformed inside the deformation space matched to a maximum grip width variation, so that independently of grip width variations of the container each container is held substantially with the same gripping force and at the same position. In case the closing cam N is rotated even further or if for other reasons high external forces are e.g. acting on one or both gripping arms G, the stop 4 of the closing lever 3 abuts on the support body 8 or in the vicinity thereof, so that the section 7 defining a bending rod is in abutment. The forces that are then acting will be transmitted directly from the stop 4 via the section 7 to the closing cam N, or inversely, without bending the section 7 any further.

If the closing cam N is then either further rotated or is brought back in opposite direction into the position shown in FIG. 1, the grip of the gripping structures 1 on the container will first loosen before finally, due to the action of the force accumulator 20, the arms A and, with these, the gripping arms G are spread apart. Before this, in case the stop 4 has been placed on the section 7 or on the support body 8, the stop 4 detaches so that the section 7 will predominantly relax until the clamp K gets into the position of FIG. 1. The arm A is now only exerting a negligible contact pressure on the closing cam N, since the opening force generated by the force accumulator, which retains the support body 8 on the closing cam N, is then the acting one.

Figure 2:
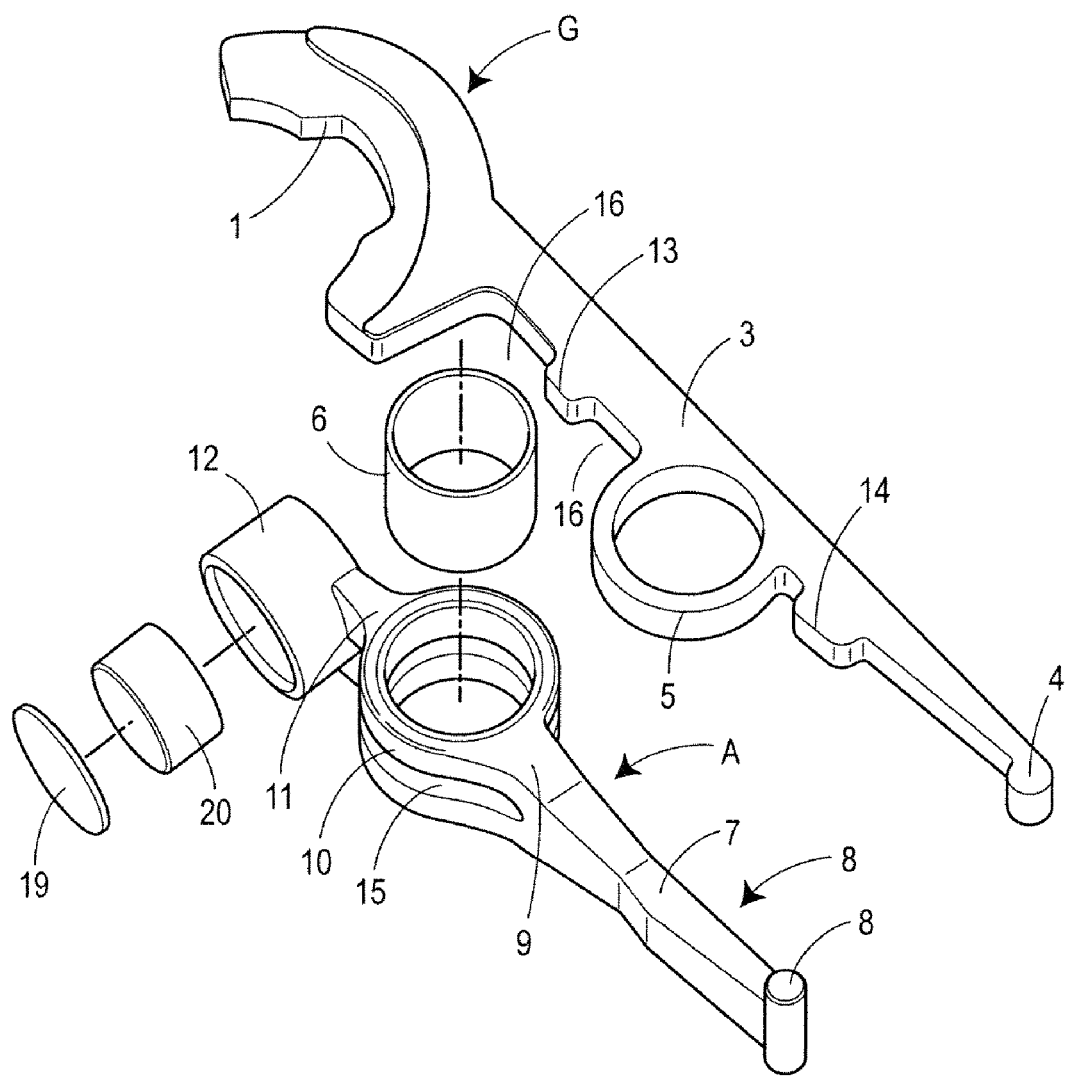
FIG. 2 is a perspective exploded view showing one half of the clamp of FIG. 1.

FIG. 2 illustrates the individual components making up one half of the clamp K of FIG. 1. The permanent magnet, which serves as a force accumulator 20, is e.g. placed in the receiving means 12 in a hygienically perfectly isolated way by sealing the cover 19. The bushing 6 can be seated under tension by means of corresponding dimensions in the bearing lugs 5, 10, or may be fixed by a securing element (not shown). The section 7 of the arm A has a substantially uniform thickness, viewed in pivoting direction, which is smaller than the thickness of the arm A in its further extension. Instead of a stop 4 formed on the closing lever 3, it would also be conceivable to provide a stop on the section 7 or on the support body 8 or to use the support body 8 as a stop, which will abut on the closing lever 3 as soon as the defined deformation space has been overcome (FIG. 1).

The invention claimed is:

1. A clamp for holding containers with a gripping force, comprising two gripping arms that are pivotably supported about a common or two separated axes in opposite direction and exhibit clamp structures at one end, a force accumulator which is functionally operative between the gripping arms and arranged at the axis side facing the clamp structures, closing levers configured as extensions of the gripping arms towards the other axis side, a closing cam rotatably arranged between the closing levers for acting on the gripping arms, at least one closing lever being actuatable by the closing cam upon rotation of said closing cam via an arm which acts with a free end on the closing cam and which is constructionally separated from the gripping arm and the closing lever thereof, and via an elastic deformation area, wherein said arm is positively coupled for joint pivotable movement of said arm, said gripping arm and said closing lever via a positive coupling comprising at least one mutual abutment area arranged on at least one of the arm that acts on the closing cam or one of the gripping arm and the closing lever, respectively, the deformation area being a section of the arm configured in the form of a bending rod, the section extending between the at least one mutual abutment area arranged at an axis side facing the closing cam and the free end of the arm which acts on the closing cam, and a defined deformation space between a stop on the closing lever and the section at least in a substantially undeformed state of the section, the deformation space being matched to a maximum grip width variation among the containers to be held such that independently of grip width variations upon rotation of the closing cam, each container is held with the same gripping force until the stop abuts the free end of the arm, the section thereof being deformed by bending while further increasing forces directly transmitted between the closing lever and the closing cam, exempting the section from transmission of excess forces.

2. The clamp according to claim 1, wherein the at least one mutual abutment area is block-shaped and is defined at both sides by cleaning openings between the arm which acts on the closing cam and the gripping arm and the closing lever, respectively.

3. The clamp according to claim 1, wherein a thickened support body is provided at the free end of the arm which acts on the closing cam.

4. The clamp according to claim 3, wherein the stop is an elevated prolongation facing the closing cam and provided at a free end of the closing lever, which stop in pivotable direction is aligned either directly with one of the support body or a zone of the section near the support body.

5. The clamp according to claim 1, wherein one of the arms that acts upon the closing cam and one deformation space are assigned to each of said two gripping arms.

6. The clamp according to claim 1, wherein the arm that acts upon the closing cam is a one-piece shaped part of plastics and the gripping arm is a one-piece shaped part of metal.

7. The clamp according to claim 1, wherein the arm that acts upon the closing cam comprises a bearing lug between two of the at least one mutual abutment area, wherein the gripping arm comprises a bearing lug between the clamp structure and the closing lever, and wherein a joint bearing bushing is inserted into both bearing lugs.

8. The clamp according to claim 7, wherein the bearing lug of the arm that acts upon the closing cam comprises a transverse slot, and wherein the bearing lug of the gripping arm is seated in the transverse slot.

9. The clamp according to claim 7, wherein the arm that acts upon the closing cam is extended beyond the bearing lug and comprises, on the extension, a receiving means for one of the force accumulator or for a component of the force accumulator.

10. The clamp according to claim 9, wherein an abutment area of the at least one mutual abutment area facing the clamp structure is positioned between the gripping arm and the receiving means.

11. The clamp according to claim 9, wherein the receiving means is a cup-shaped receiving means accommodating a permanent magnet.

12. The clamp according to claim 1, wherein said bending rod is of an at least approximately constant thickness, which is reduced in size when measured in the pivotal direction about the axis in comparison with a further extension of the arm which acts on the closing cam.

13. The clamp according to claim 1, wherein one of the at least one mutual abutment area is arranged at each side of the axis.

* * * * *